United States Patent [19]

Suzuki et al.

[11] Patent Number: 5,510,664
[45] Date of Patent: Apr. 23, 1996

[54] BRUSHLESS MOTOR

[75] Inventors: Mitsuo Suzuki, Tokyo; Yukio Itami, Yokohama; Yoshio Hashimoto; Mutsumi Yamamoto, both of Tokyo; Yoshihiro Takahashi, Shibata, all of Japan

[73] Assignees: Ricoh Company, Ltd., Tokyo; Tohoku Richo Co., Ltd., Miyagi, both of Japan

[21] Appl. No.: 116,959

[22] Filed: Sep. 7, 1993

[30] Foreign Application Priority Data

Sep. 10, 1992 [JP] Japan .................. 4-241477

[51] Int. Cl.$^6$ ............................................. H02K 1/22
[52] U.S. Cl. .................. 310/268; 310/68 B; 310/68 R; 310/89; 310/156; 310/179; 310/DIG. 6
[58] Field of Search ............................. 310/268, 90.5, 310/156, 51, DIG. 6, 68 R, 179, 261, 68 B, 89

[56] References Cited

U.S. PATENT DOCUMENTS

| | | |
|---|---|---|
| 4,072,881 | 2/1978 | Ban . |
| 4,737,674 | 4/1988 | Miyao ..................... 310/268 |
| 4,746,827 | 5/1988 | Ochiai ..................... 310/156 |
| 5,030,864 | 7/1991 | Van Hout ................. 310/156 |
| 5,093,593 | 3/1992 | Philipp ..................... 310/71 |
| 5,289,069 | 2/1994 | Hasegawa ................ 310/156 |

FOREIGN PATENT DOCUMENTS 58-26264  6/1983  Japan .

*Primary Examiner*—R. Skudy
*Attorney, Agent, or Firm*—Oblon, Spivak, McClelland, Maier & Neustadt

[57] ABSTRACT

In a brushless motor, the number of coreless armature coils is set to 3n when the number of magnetic poles of a magnet for a magnetic field is set to 2n where n is a positive integer. An opening angle of each of the armature coils is set to 360/3n degrees. A notch portion is formed in an outer circumferential portion of the magnet for a magnetic field. A recessed portion is formed by this notch portion and an inner circumferential portion of a yoke. The recessed portion constitutes a groove for correcting a balance of each of the magnet for a magnetic field and a rotating body when this magnet and the rotating body are rotated. A motor housing and a harness are electrically connected to a printed board. The housing is connected to the ground through this harness and a harness for power. In this brushless motor, a magnetizing frequency is reduced and driving efficiency of a control circuit can improved when the brushless motor is rotated at a high speed. Further, it is possible to prevent an iron or copper loss from being caused so that an increase in temperature of the brushless motor can be restrained.

12 Claims, 4 Drawing Sheets

BRUSHLESS MOTOR

BACKGROUND OF THE INVENTION

1. Field of the Invention

The present invention relates to a brushless motor used in e.g., a scanner motor and rotating a polygon mirror.

2. Description of the Related Art

A general image forming apparatus such as a laser printer, a digital copying machine, etc, has a polygon scanner for deflecting a light beam to perform a scanning operation. A high speed rotation has been recently required for this polygon scanner to increase an image forming speed of the image forming apparatus. A brushless motor having high performance is disposed in the polygon scanner to achieve this high speed rotation.

In the general polygon scanner having the brushless motor of this kind, for example, plural irregularities for generating a dynamic pressure are formed on an outer circumferential face of a fixed shaft fixed to a metallic housing. For example, these irregularities are constructed by herringbone grooves. A cylindrical rotating shaft is disposed outside this fixed shaft such that a predetermined bearing clearance is formed between the fixed shaft and the rotating shaft. Thus, a radial dynamic pressure air bearing is constructed and a rotary polygon mirror is further attached to this rotating shaft in a certain case.

The brushless motor has a magnet having 2n magnetic poles magnetized at an equal opening angle with respect to N and S poles and disposed in the rotating shaft. In this case, n is an even number equal to or greater than 2. The brushless motor further has cylindrical armatures each having three phases and opposed to this magnet and disposed in the housing. Normally, 3n/2 armatures are disposed in the brushless motor. In this brushless motor, the opening angle is set by a width of field magnetic poles arranged such that the field magnetic poles are alternately adjacent to each other. The armatures are arranged at an equal pitch such that the armatures do not overlap each other.

Concretely, the brushless motor has four magnetic poles, three armature coils and an opening angle of 90°. In another system, the brushless motor has eight magnetic poles, six armature coils and an opening angle of 45°. The armatures are mounted onto a printed board and the brushless motor is magnetized or driven by a driver, etc. disposed on the printed board in a predetermined way. Thus, the magnet is rotated so that the rotating shaft and the polygon mirror are rotated. For example, the brushless motor of this kind is shown in Japanese Patent Publication (KOKOKU) No. 58-26264.

However, this general brushless motor is constructed by 3n/2 armatures when the magnet is formed by 2n magnetic poles. For example, when the brushless motor has eight magnetic poles and six armature coils, a magnetizing frequency of the brushless motor is increased when the polygon mirror is rotated at a high speed equal to or higher than 20,000 rpm. Therefore, driving efficiency of a control circuit for controlling an operation of the brushless motor is reduced so that an electric current flowing through the brushless motor is increased. Further, an iron loss of the brushless motor is increased so that a temperature of the brushless motor is increased.

Namely, when the brushless motor is constructed by eight magnetic poles and six armature coils, the number of magnetic poles is large so that the magnetizing frequency is necessarily set to a high frequency and driving efficiency of the control circuit is therefore reduced. The iron loss is increased in accordance with the second power of a frequency. Accordingly, when the magnetizing frequency is increased, the iron loss is necessarily increased so that a temperature of the brushless motor is increased.

In contrast to this, when the brushless motor is constructed by four magnetic poles and three armature coils and an inductive voltage constant equal to that provided by six armature coils is obtained, the number of turns per one coil is twice or more that in the case of the six armature coils. Accordingly, a winding coil must be thin to secure a space similar to that provided by the eight magnetic poles and the six armature coils. However, when the winding coil is set to be thin, electric resistance of the brushless motor is increased so that a copper loss of the brushless motor is caused and a temperature of the brushless motor is thereby increased. Accordingly, in each of the above cases, it is impossible to sufficiently cope with a high speed rotation of the brushless motor.

Further, in this brushless motor, it is necessary to correct the balance of a rotating body of the rotating shaft, the polygon mirror, etc. with high accuracy so as to rotate the polygon scanner, etc. at a high rotational speed with low vibration. Therefore, a ring for balance correction is disposed in the polygon scanner and a circumferential groove is processed and formed in a member for fixing the magnet thereto so that cost of the brushless motor is increased.

Further, the housing of the brushless motor is formed by a metal so that it is necessary to electrically connect the housing to the ground when this brushless motor is assembled into a copying machine, etc. When a constructional member of the copying machine is formed by a metallic material, there is no problem when the brushless motor is assembled into the copying machine. However, when this constructional member is formed by an insulating material such as resin cheaply manufactured, one wire end portion of the constructional member is generally fixed to a housing portion by a screw. Thereafter, another wire end portion is connected to a metallic frame of the copying machine. Therefore, an attaching operation of the brushless motor is complicated so that assembly cost of the brushless motor is very increased.

SUMMARY OF THE INVENTION

It is therefore a first object of the present invention to provide a brushless motor in which driving efficiency of a control circuit can be improved by reducing a magnetizing frequency at a high speed rotating time of the motor, and it is possible to prevent an iron or copper loss of the motor from being caused so that an increase in temperature of the motor can be restrained.

A second object of the present invention is to provide a brushless motor in which the balance of a rotating body can be easily corrected without disposing any ring for only balance correction, etc. and the brushless motor is cheaply manufactured.

A third object of the present invention is to provide a brushless motor in which the brushless motor can be easily connected to the ground by using a harness as a terminal wire for the ground and assembly cost of the brushless motor can be reduced.

In accordance with a first structure of the present invention, the above objects can be achieved by a brushless motor comprising a magnet for a magnetic field having a plurality of magnetic poles N and S alternately magnetized at an equal opening angle; and a plurality of coreless armature coils opposed to the magnet within a magnetic path of the magnet and spaced from each other at an equal distance such that no armature coils overlap each other; the number of the coreless armature coils being set to 3n when the number of magnetic poles of the magnet for a magnetic field is set to 2n where n is a positive integer.

In accordance with a second structure of the present invention, an opening angle of each of the coreless armature coils is equal to 360/3n degrees.

In accordance with a third structure of the present invention, the above objects can be also achieved by a brushless motor comprising a notch portion formed in an outer circumferential portion of a magnet for a magnetic field; and a recessed portion formed by this notch portion and an inner circumferential portion of a gripping member for holding the notch portion; the recessed portion constituting a groove for correcting a balance of the magnet for a magnetic field when this magnet is rotated.

in accordance with a fourth structure of the present invention, the above objects can be also achieved by a brushless motor comprising a magnet for a magnetic field; and a gripping member for gripping the magnet for a magnetic field; an outer circumferential end portion of the gripping member being bent such that a bending length of this outer circumferential end portion is longer than a thickness of the magnet for a magnetic field; and this bent portion correcting a balance of the magnet for a magnetic field when this magnet is rotated.

In accordance with a fifth structure of the present invention, the above objects can be also achieved by a brushless motor comprising a housing for the brushless motor; a coil substrate; and a harness connected to the coil substrate, or a harness for supplying power to the brushless motor; the housing being electrically connected to the ground through the harnesses.

In accordance with the first structure of the present invention, the number of coreless armature coils is set to 3n when the number of magnetic poles of the magnet for a magnetic-field is set to 2n where n is a positive integer. In such a combination, no magnetizing frequency is increased and no coil resistance is increased. Therefore, it is possible to reduce the generation of a copper or iron loss so that an increase in temperature of the brushless motor can be restrained. When such a combination is used, no opening angle of the magnet for a magnetic field is equal to that of each of the armature coils so that efficiency of a motor unit is apparently reduced. However, driving efficiency of a driving circuit for driving the brushless motor is increased so that entire efficiency of the brushless motor is increased. Accordingly, it is possible to cope with a super high speed rotation of the brushless motor.

In accordance with the second structure of the present invention, the opening angle of each of coreless armature coils is set to 360/3n degrees. Accordingly, effective portions of the armature coils can be set to be parallel to each other. Therefore, efficiency of the brushless motor is maximized when the number of magnetic poles is equal to 2n and the number of armature coils is equal to 3n (n is a positive integer).

In accordance with each of the third and fourth structures of the present invention, a notch portion is formed in an outer circumferential portion of the magnet for a magnetic field. A recessed portion is formed by this notch portion and an inner circumferential portion of a gripping member. The recessed portion constitutes a groove for correcting the balance of a rotating body when this rotating body is rotated. Further, an outer circumferential end portion of the gripping member is bent such that a bending length of this outer circumferential end portion is longer than a thickness of the magnet for a magnetic field. This bent portion corrects a balance of this magnet when this magnet is rotated. Accordingly, the magnet for a magnetic field is stably rotated with low vibration without disposing any ring, etc. for correcting a balance of this magnet. Therefore, cost of the brushless motor is reduced.

In accordance with the fifth structure of the present invention, the housing for the brushless motor is electrically connected to the ground through a harness connected to the coil substrate, or a harness for supplying power to the brushless motor. Accordingly, it is possible to omit an operation for attaching a terminal for the ground connection to the housing as in the general brushless motor so that the brushless motor can be simply connected to the ground. As a result, assembly cost of the brushless motor is reduced.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a brushless motor in the present invention will next be described in detail with reference to the accompanying drawings.

FIGS. 1 to 4 show a brushless motor in accordance with one embodiment of the present invention. In FIGS. 1 to 4, the present invention is applied to a polygon scanner.

Figure 1:
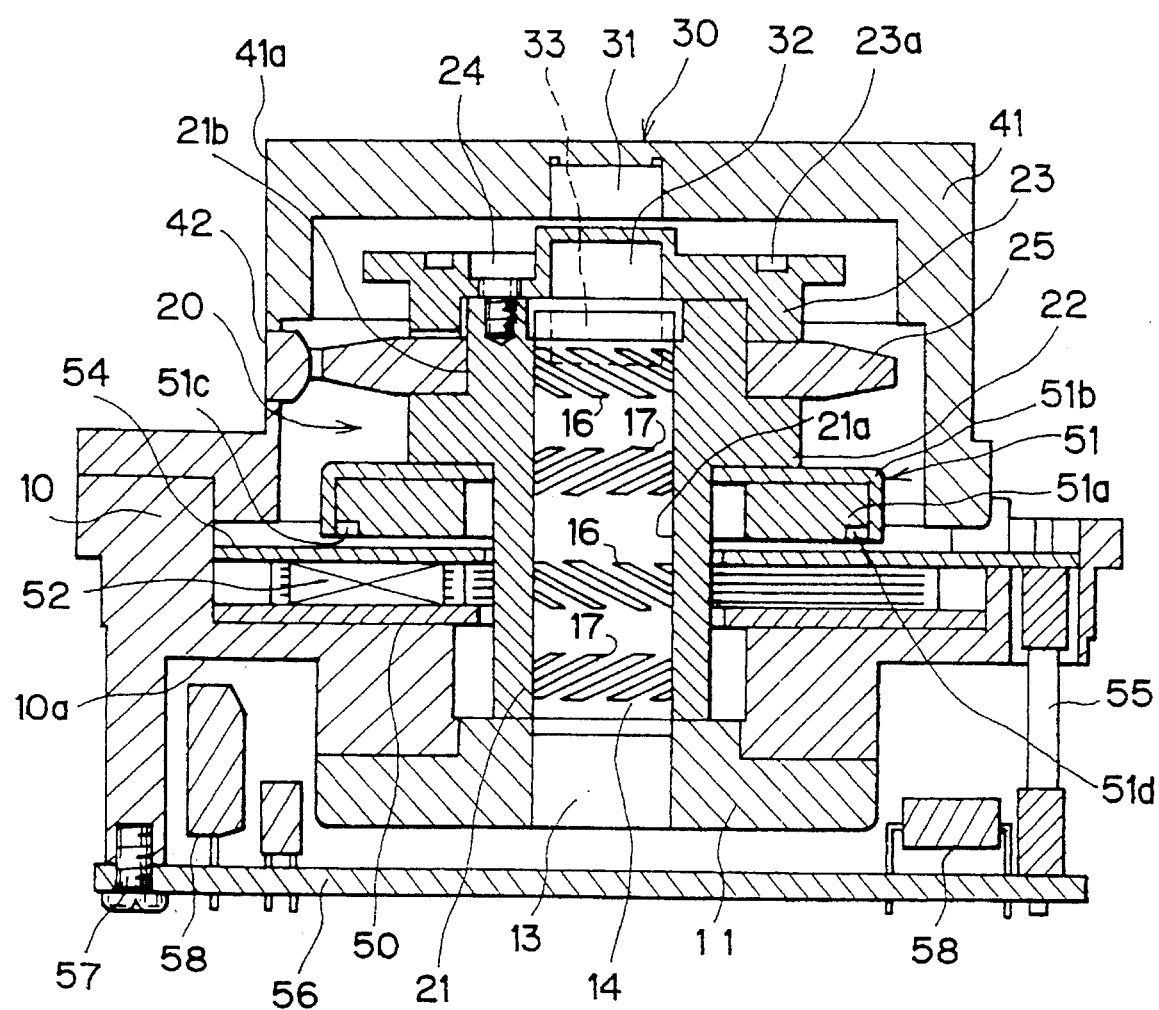
FIG. 1 is a cross-sectional view showing a brushless motor in accordance with one embodiment of the present invention and showing the entire construction of a polygon mirror having this brushless motor.

The brushless motor in this embodiment is constructed as follows. In FIG. 1, reference numeral 10 designates a motor housing. A recessed portion 10a is formed in an outer circumferential portion of this housing 10 on a bottom rear face thereof. A fixed shaft base 11 constitutes a bottom portion of the motor housing 10. A fixed shaft 13 is perpendicularly fitted and fixed into a central portion of the fixed shaft base 11.

A face 14 of a radial bearing as a dynamic pressure air bearing is formed in an outer circumference of this fixed shaft 13. A pair of herringbone grooves 16 and 17 for generating a dynamic pressure are formed on this radial bearing face 14 and are spaced from each other at an equal distance in a circumferential direction. The radial bearing face 14 is opposed to an inner circumferential face 21a of a cylindrical rotating shaft 21. The radial bearing face 14 is separated by a predetermined distance from the inner circumferential face of the rotating shaft 21 so that the rotating shaft 21 can be rotated with respect to the fixed shaft 13.

A mirror receiving flange 22 is formed in an upper portion of the rotating shaft 21. Further, a mirror presser 23 and a polygon mirror 25 are also attached to this upper portion of the rotating shaft 21. The polygon mirror 25 is fitted onto an outer circumferential face 21b of the upper portion of the rotating shaft 21. The polygon mirror 25 is pressed against the flange 22 through the mirror presser 23 by using a bolt 24 screwed into the upper portion of the rotating shaft 21. The mirror presser 23 also holds a magnet 32 constituting an axial magnetic bearing 30 in a central portion of this mirror presser. A balance-correcting groove 23a for correcting the unbalance of a rotating body 20 is formed in an upper face portion of the mirror presser 23.

The axial bearing 30 is constructed by three magnets 31, 32, 33 repulsive to each other on an axis of the fixed shaft 13. The magnet 31 is attached to an upper casing 41 above the magnet 32. The magnet 33 is fixed to an upper end of the fixed shaft 13. Thus, the rotating body 20 is composed of the rotating shaft 21, the mirror presser 23, the polygon mirror 25 and the magnet 32 and is biased such that the rotating body 20 floats upward from the fixed shaft 13. Thus, the rotating shaft 21 is supported such that the rotating shaft 21 does not come into contact with the fixed shaft 13. A window 42 for deflection is disposed in a peripheral wall portion 41a of the upper casing 41. This window 42 for deflection is disposed to make a laser beam incident to the polygon mirror 25 and emitted from this polygon mirror 25.

Figure 2A:
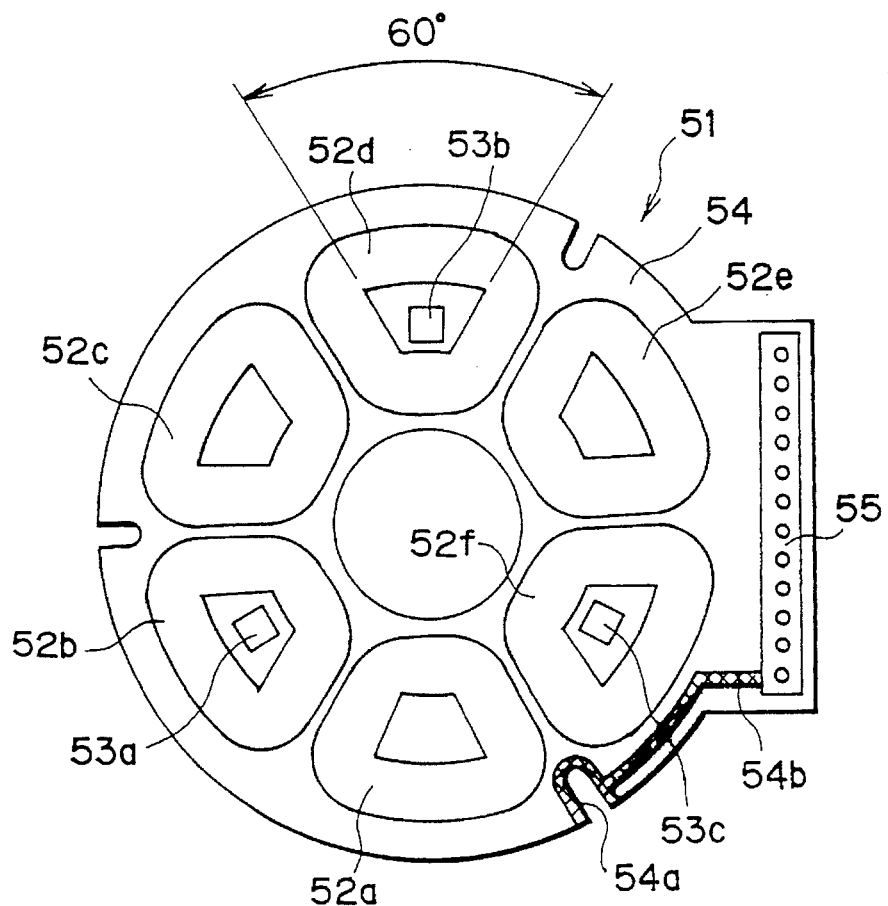
FIG. 2a is a view showing the construction of armature coils in the brushless motor in this embodiment.
Figure 2B:
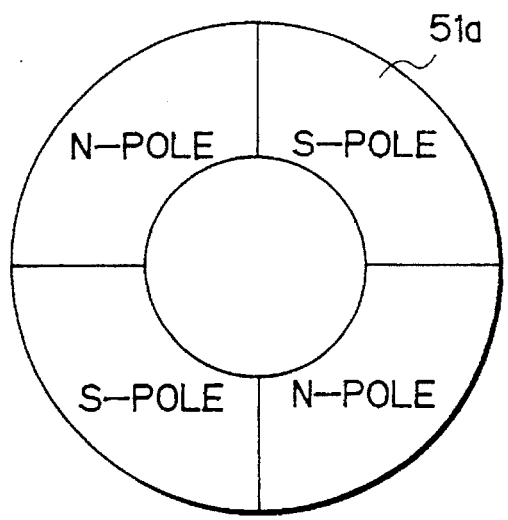
FIG. 2b is a view showing the construction of a magnet for a magnetic field in the brushless motor in this embodiment.

A brushless motor 50 of a face opposing type is of an axial gap type and moves the polygon mirror 25. As shown in FIGS. 2a and 2b, this brushless motor 50 has a rotor magnet assembly body 51 fixed to the rotating shaft 21, an armature coil portion 52 and Hall elements 53a to 53c. The armature coil portion 52 is opposed to a lower face of the rotor magnet assembly body 51 and is separated from the rotor magnet assembly body 51 by a predetermined distance in an axial direction of the motor. The rotor magnet assembly body 51 constitutes a motor constructional portion in which a magnet 51a for a magnetic field is integrally mounted to the rotating shaft 21 by a yoke 51b as a holding member.

The magnet 51a for a magnetic field has a plurality of magnetic poles N and S alternately magnetized at an equal opening angle. A notch portion 51c is formed in an outer circumferential portion of the magnet 51a and extends in a circumferential direction. A recessed portion 51d is formed by this notch portion 51c and an inner circumferential portion of the yoke 51b. This recessed portion 51d constitutes a groove for correcting a balance of each of the rotating body 20 and the magnet 51a when the rotating body 20 is rotated together with the magnet 51a for a magnetic field.

The armature coil portion 52 has six coreless armature coils 52a to 52f disposed on a printed coil board 54. These armature coils 52a to 52f are spaced from each other at an equal distance at an opening angle of 60° such that no armature coils 52a to 52f overlap each other within a magnetic path of the magnet 51a for a magnetic field.

When the number of magnetic poles of the magnet 51a for a magnetic field is set to 2n (n is a positive integer), 3n armature coils are arranged. In this embodiment, the number of magnetic poles of the magnet 51a is concretely set to 4 so that six armature coils 52a to 52f are arranged. The opening angle of each of the armature coils 52a to 52f is set to 360/3n degrees. Since the number of magnetic poles of the magnet 51a for a magnetic field is set to 4, this opening angle is set to 60° as mentioned above.

Figure 3A:
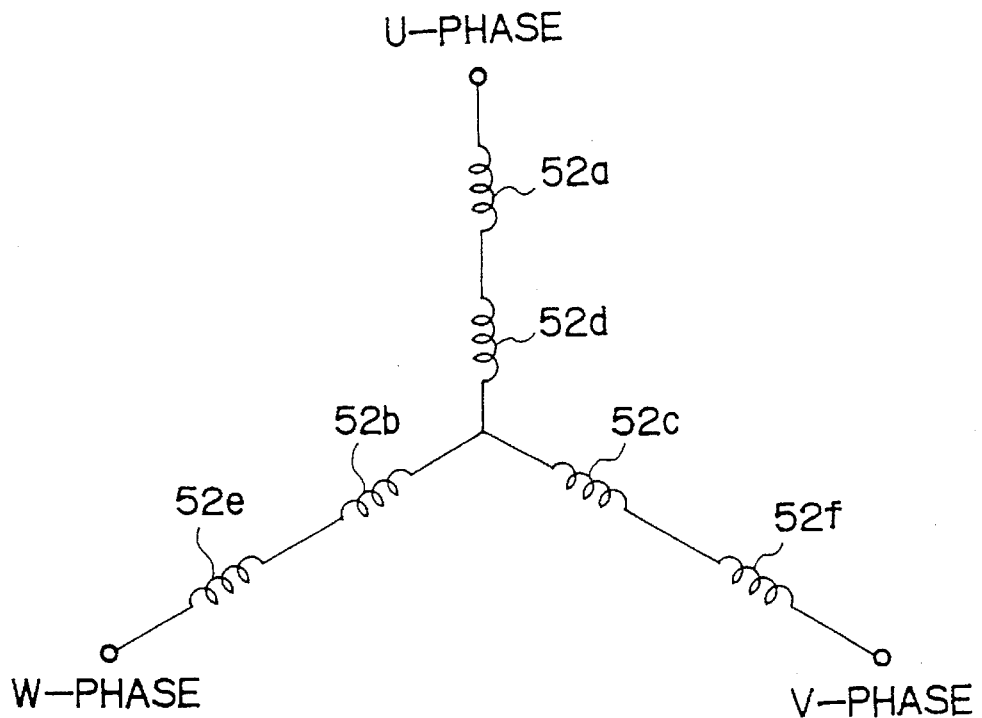
FIG. 3a is a view showing a series connecting system of the armature coils in this embodiment.
Figure 3B:
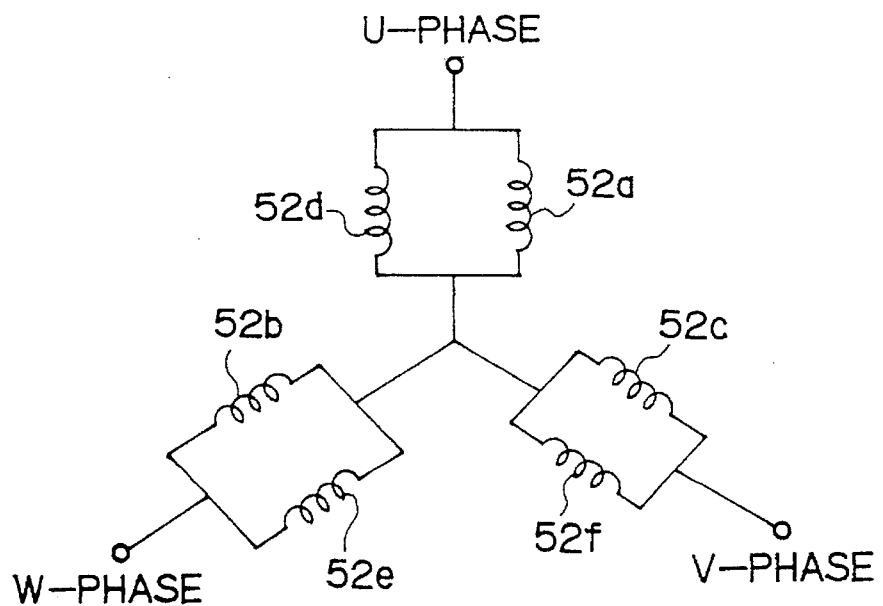
FIG. 3b is a view showing a parallel connecting system of the armature coils in this embodiment.

As shown in FIG. 3a, the armature coil 52a is connected to the opposite armature coil 52d through a lead wire. The armature coil 52b is connected to the armature coil 52c through a lead wire. The armature coil 52c is connected to the armature coil 52f through a lead wire. The Hall elements 53a, 53b and 53c (shown in FIG. 2a) are respectively disposed in the armature coils 52b, 52d and 52f, thereby constructing a U-phase, a V-phase and a W-phase as shown in FIG. 3a. FIG. 3a shows a series connecting system of the armature coils. However, the armature coils may be constructed by a parallel connecting system as shown in FIG. 3b. The connecting system of the armature coils may be suitably selected in accordance with the number of rotations of the brushless motor and a space for attaching the brushless motor.

The printed board 54 is connected to a printed board 56 for driving the brushless motor through a harness 55 for driving the brushless motor. A portion of this harness 55 on a side of the printed board 56 is connected to an unillustrated harness for power. A plurality of circuit parts 58 such as transistors, integrated circuits (ICs), etc. are connected to the printed board 56 for driving the brushless motor. This printed board 56 is fixed to a lower face of the housing 10 by a bolt 57. The recessed portion 10a is formed on a rear face of the housing 10. Accordingly, a high circuit substrate 58 is mounted onto the printed board 56 such that this circuit substrate 58 is located in this recessed portion 10a.

A notch portion 54a is formed in the printed board 54. This notch portion 54a is attached to the housing 10 by an unillustrated bolt. The notch portion 54a is connected to the harness 55 through a conductor 54b. The housing 10 is connected to the ground through the conductor 54b, the harness 55 and the harness for power.

An operation of the brushless motor in the present invention will next be explained.

When a polygon scanner is assembled into a copying machine, the polygon scanner is fixedly arranged in a predetermined arranging space of the copying machine by using bolts, etc. The harness for power is then attached to a power supplying portion within a body of the copying machine.

Thereafter, when an electric current is sequentially supplied from the circuit parts 58 to each of the predetermined opposite armature coils 52a to 52f so as to operate the polygon scanner, the opposite armature coils 52a to 54f are magnetized so that the rotor magnet assembly body 51 is rotated. Thus, the rotating shaft 21 and the polygon mirror 25 in the rotating body 20 are rotated. When the polygon mirror 25 is rotated, air is pressurized within a bearing clearance between the rotating shaft 21 and the fixed shaft 13 in a rotating direction of the motor along the herringbone grooves 16 and 17 formed on the radial bearing face 14 of the fixed shaft 13, thereby generating a dynamic pressure.

When this dynamic pressure reaches a predetermined pressure, the rotating shaft 21 completely floats from the fixed shaft 13 in a radial direction so that the rotating shaft 21 is separated from the fixed shaft 13 and attains a high speed rotating state. A balance of the rotating body 20 is corrected by the recessed portion 51d as a groove for correcting this balance so that the polygon scanner is stably rotated with low vibration at a high speed rotating time thereof.

In this embodiment, when the number of magnetic poles of the magnet 51a for a magnetic field is set to 2n (n is a positive integer), 3n coreless armature coils are disposed. For example, when the number of magnetic poles of the magnet 51a for a magnetic field is set to 4, six coreless armature coils 52a to 52f are arranged. Accordingly, no magnetizing frequency is increased and no coil resistance is increased. Therefore, it is possible to prevent a copper or iron loss from being caused so that an increase in temperature of the brushless motor can be restrained. When such a combination of the magnetic poles and the armature coils is used, no opening angle of the magnet 51a for a magnetic field is equal to that of each of the armature coils 52a to 52f so that efficiency of a motor unit is apparently reduced. However, driving efficiency of the circuit parts 58 as a control circuit can be increased so that entire efficiency of the brushless motor can be increased. Accordingly, it is possible to cope with a super high speed rotation of the brushless motor.

The opening angle of each of the armature coils 52a to 52f is set to 360/3n degrees. Namely, this opening angle is set to 60° in this embodiment. Accordingly, effective portions of adjacent coils 52a to 52f can be set to be parallel to each other. Therefore, efficiency of the brushless motor can be maximized when the number of magnetic poles is equal to 2n and the number of armature coils is equal to 3n where n is a positive integer.

The notch portion 51c is formed in an outer circumferential portion of the magnet 51a. The recessed portion 51d is formed by this notch portion 51c and an inner circumferential portion of the yoke 51b. This recessed portion 51d constitutes a groove for correcting balances of the magnet 51a and the rotating body 20 when the magnet 51a for a magnetic field and the rotating body 20 are rotated. Accordingly, the magnet 51a for a magnetic field and the rotating body 20 can be stably rotated with low vibration without disposing any ring, etc. for correcting the balance of the rotating body 20 as in the general brushless motor. Therefore, cost of the brushless motor can be reduced.

The conductor 54b is disposed to electrically connect the housing 10 and the harness 55 to the printed board 54. The housing 10 is connected to the ground through this conductor 54, the harness 55 and a harness for power. Accordingly, it is possible to omit an operation for attaching a terminal for the ground connection to the housing 10 as in the general brushless motor so that the polygon scanner can be simply connected to the ground. As a result, assembly cost of the polygon scanner can be reduced.

This embodiment relates to an example in which the brushless motor is used in the polygon scanner. However, the present invention can be applied to any rotating device rotated at a high speed. Further, the present invention can be also applied to only a brushless motor used as a unit.

In this embodiment, the brushless motor of an axial gap type is used, but it is also possible to use a brushless motor of an inner or outer rotor system in which a magnetic field is generated in a radial direction of the rotating shaft 21.

Figure 4:
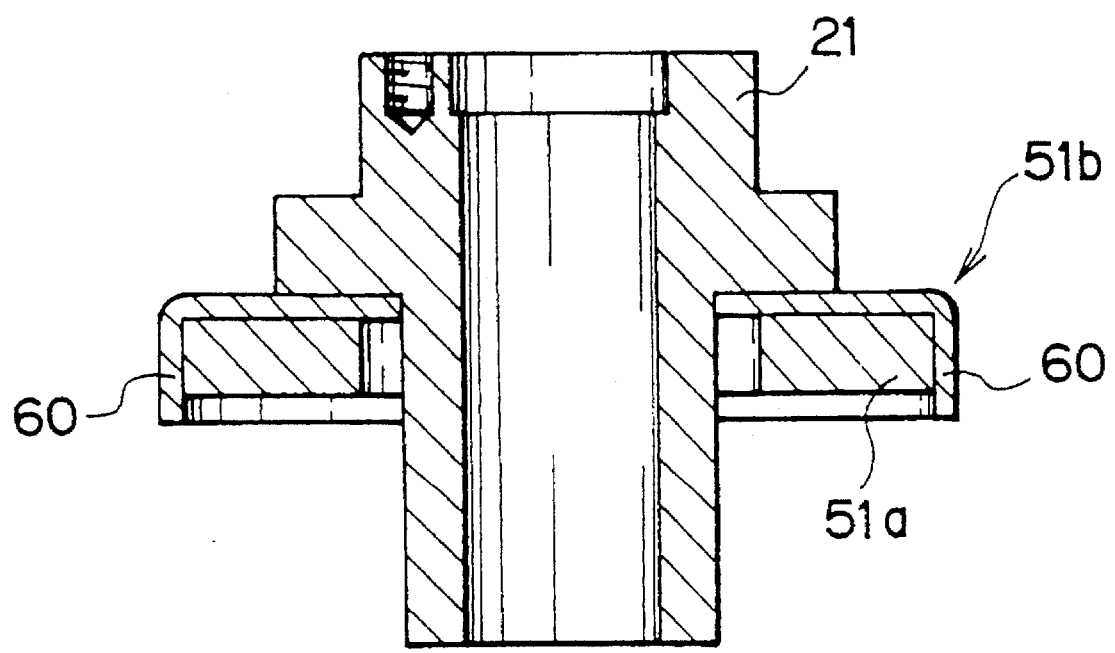
FIG. 4 is a constructional view showing another shape of a balance correcting portion of the brushless motor and showing a rotating shaft this balance correcting portion and a rotor magnet assembly body.

In this embodiment, a groove for correcting balances of the rotating body 20 and the magnet 51a is constructed by the recessed portion 51d. However, as shown in FIG. 4, a bent portion 60 may be formed such that a bending length of this bent portion 60 is longer than a thickness of the magnet 51a for a magnetic field in an outer circumferential end portion of the yoke 51b. In this case, this bent portion 60 corrects a balance of the magnet 51a when this magnet 51a is rotated. When this bent portion 60 is used, the magnet 51a for a magnetic field and the rotating body 20 can be also stably rotated with low vibration.

In accordance with a first structure of the present invention, no magnetizing frequency is increased and no coil resistance is increased. Therefore, it is possible to prevent a copper or iron loss from being caused so that an increase in temperature of the brushless motor can be restrained. When such a combination of magnetic poles and armature coils is used, no opening angle of the magnet for a magnetic field is equal to that of each of the armature coils so that efficiency of a motor unit is apparently reduced. However, driving efficiency of a control circuit can be increased so that entire efficiency of the brushless motor can be increased. Accordingly, it is possible to cope with a super high speed rotation of the brushless motor.

In accordance with a second structure of the present invention, effective portions of adjacent armature coils can be set to be parallel to each other. Therefore, efficiency of the brushless motor can be maximized when the number of magnetic poles is equal to 2n and the number of armature coils is equal to 3n (n is a positive integer).

In accordance with each of third and fourth structures of the present invention, the magnet for a magnetic field can be stably rotated with low vibration without disposing any ring, etc. for correcting a balance of this magnet as in the general brushless motor. Therefore, cost of the brushless motor can be reduced.

In accordance with a fifth structure of the present invention, it is possible to omit an operation for attaching a terminal for the ground connection to the housing as in the general brushless motor so that the brushless motor can be simply connected to the ground. As a result, assembly cost of the brushless motor can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A brushless motor, comprising:
   a magnet for a magnetic field having a plurality of magnetic poles N and S alternately magnetized at an equal opening angle; and
   a plurality of coreless armature coils opposed to the magnet within a magnetic path of the magnet and spaced from each other at an equal distance such that no armature coils overlap each other; and
   a number of said coreless armature coils being set to 3n when a number of magnetic poles of said magnet for a magnetic field is set to 2n, where n is a positive integer.

2. A brushless motor as claimed in claim 1, wherein an opening angle of each of said coreless armature coils is equal to 360/3n degrees.

3. A brushless motor comprising:
   a notch portion formed in an outer circumferential portion of a magnet for a magnetic field; and
   a recessed portion formed by this notch portion and an inner circumferential portion of a gripping member for holding the notch portion;
   the recessed portion constituting a groove for correcting a balance of the magnet for a magnetic field when this magnet is rotated.

4. A brushless motor comprising:
   a magnet for a magnetic field; and a gripping member for gripping the magnet for a magnetic field;

an outer circumferential end portion of the gripping member being bent such that a bending length of this outer circumferential end portion is longer than a thickness of the magnet for a magnetic field; and this bent portion correcting a balance of the magnet for a magnetic field when this magnet is rotated.

5. A brushless face-opposed type motor, comprising:

a housing;

a printed board having mounted thereon coreless armature coils and Hall elements, the printed board including a pattern of copper foil, wherein said housing is electrically connected to the printed board by the pattern of copper foil and said housing is grounded through a harness for said brushless face-opposed motor.

6. A brushless motor as claimed in claim 1, wherein said brushless motor is a face-opposed type motor and is used for driving a polygon scanner.

7. A brushless motor, comprising:

a housing;

a first printed circuit board having mounted thereon armature coils and Hall elements, the first printed circuit board including a recess for receiving a bolt;

an annular magnet having alternating poles, the annular magnet being mounted to a shaft and disposed next to the first printed circuit board;

a wire harness connected to the armature coils and Hall elements of the first printed circuit board;

a conductor on the first printed circuit board connected to a ground wire of the wire harness; and a bolt in the recess of the first printed circuit board contacting said conductor on the first printed circuit board, the bolt also passing through the housing.

8. A brushless motor according to claim 7, further comprising:

a second printed circuit board having mounted thereon driving circuitry of the brushless motor the driving circuitry being connected through the wire harness to the armature coils and Hall elements of the first printed circuit board.

9. A brushless motor according to claim 8, wherein:

said bolt connects the housing to a ground through said conductor on the first printed circuit board.

10. A brushless motor according to claim 7, wherein:

said bolt connects the housing to a ground through said conductor on the first printed circuit board.

11. A brushless motor according to claim 7, further comprising:

a polygon mirror connected to the shaft.

12. A brushless motor according to claim 9, further comprising:

a polygon mirror connected to the shaft.

* * * * *

UNITED STATES PATENT AND TRADEMARK OFFICE
CERTIFICATE OF CORRECTION

PATENT NO. : 5,510,664
DATED : April 23, 1996
INVENTOR(S) : Mitsuo SUZUKI et al.

It is certified that error appears in the above-indentified patent and that said Letters Patent is hereby corrected as shown below:

On the title page, Item [73], the second Assignee's name is spelled incorrectly. It should read:

--[73] Assignees: Ricoh Company, Ltd., Tokyo; Tohoku Ricoh Co., Ltd., Miyagi, both of Japan--

Signed and Sealed this

Sixth Day of August, 1996

Attest:

BRUCE LEHMAN

Attesting Officer     Commissioner of Patents and Trademarks